United States Patent [19]

Kondoh

[11] 3,919,464

[45] Nov. 11, 1975

[54] FACSIMILE TRANSMISSION SYSTEM

[75] Inventor: Mitsuru Kondoh, Musashino, Japan

[73] Assignee: Ricoh Co., Ltd., Tokyo, Japan

[22] Filed: Dec. 7, 1973

[21] Appl. No.: 422,793

[30] Foreign Application Priority Data

Dec. 15, 1972 Japan .............................. 47-125878

[52] U.S. Cl. ......... 178/6; 178/DIG. 3; 178/DIG. 27; 178/6.6 R

[51] Int. Cl.$^2$ ............................................ H04N 1/32

[58] Field of Search ............ 178/6, DIG. 3, DIG. 27, 178/6.6 R; 358/525 O

[56] References Cited

UNITED STATES PATENTS

| | | | |
|---|---|---|---|
| 3,560,651 | 2/1971 | Roth | 178/6 |
| 3,581,000 | 5/1971 | Hansen | 178/6 |
| 3,646,256 | 2/1972 | Jacob | 178/DIG. 3 |

*Primary Examiner*—Howard W. Britton

*Attorney, Agent, or Firm*—Cooper, Dunham, Clark, Griffin & Moran

[57] ABSTRACT

In a facsimile transmission system of the type in which image information obtained by scanning a subject copy is directly transmitted or compressed in code and then transmitted, there is provided a monitor circuit adapted to monitor the density of image information and means adapted to vary the density of scanning lines (the number of scanning lines per linear inch or milimeter) in response to the output of the monitor circuit. When the density of image information is low, the density of scanning lines is reduced; when the density is high, the density of scanning lines is increased.

12 Claims, 4 Drawing Figures

FACSIMILE TRANSMISSION SYSTEM

BACKGROUND AND SUMMARY OF THE INVENTION

The present invention relates to generally a system for scanning a subject copy to be transmitted and transmitting image information obtained by scanning directly or after coding and compressing the image information, and more particularly a facsimile transmission system in which the density of scanning lines may be automatically varied depending upon the images on the subject copy so that the transmission time may be reduced without adversely affecting the details of the images reproduced.

In the case of the facsimile transmission system of the type described above, the higher the density of scanning lines, the longer the transmission time will become, and the higher the scanning line density, the more evident the fine detail of the reproduced images will become. However, in general, a subject copy has not only portions in which the black and white elementary area patterns are dense but also portions in which the patterns are thin or coarse. Even when such thin or coarse patterns are scanned with a relatively low scanning line density, images with sufficiently high quality may be reproduced. Therefore it becomes possible to reduce the transmission time without adversely affecting the quality of the reproduced images if the density of scanning lines can be varied depending upon the image patterns on a subject copy. However, with the conventional facsimile transmission systems the scanning line density must be manually varied by an operator according to his own judgement so that even when only a part of the subject copy contains fine patterns, the scanning line density must be so selected as to enable a facsimile receiver to reproduce these fine patterns faithfully. Therefore, a reduction in transmission time cannot be attained, and a selection of the scanning line density depending upon fine and coarse patterns on the subject copy cannot be obtained.

There has been proposed a variable scanning speed type facsimile system which scans a subject copy at a slow speed when a portion of high information density is scanned but scans at a high speed when a portion of low information density is scanned. This system has been developed in order to maintain the transmission speed constant, but it does not reduce the transmission time by varying the scanning line density depending upon the patterns on a subject copy.

One of the objects of the present invention is therefore to provide a facsimile transmission system capable of automatically varying the scanning line density depending upon the detail of patterns on a subject copy.

According to one preferred embodiment of the present invention, a subject copy is transported by a transport mechanism and is scanned by a suitable scanning mechanism in the direction at a right angle to the direction of the transportation of the subject copy so that the patterns upon the subject copy may be read out. The output signals of the scanning mechanism are quantized, sampled, encoded, modulated and transmitted through a transmission line. The quantized and sampled signals are also transferred into a monitor circuit so that the detail or density of the patterns may be detected. The output signals of the monitor circuit are applied to means adapted to vary the speed of the subject copy transport mechanism so that the subject copy transport speed is automatically increased when the detail or density of patterns on the subject copy becomes fine while the speed is automatically decreased when the detail or density becomes coarse.

The present invention will become more apparent from the following description of preferred embodiments thereof taken in conjunction with the accompanying drawing.

DESCRIPTION OF THE PREFERRED EMBODIMENT

Figure 1:
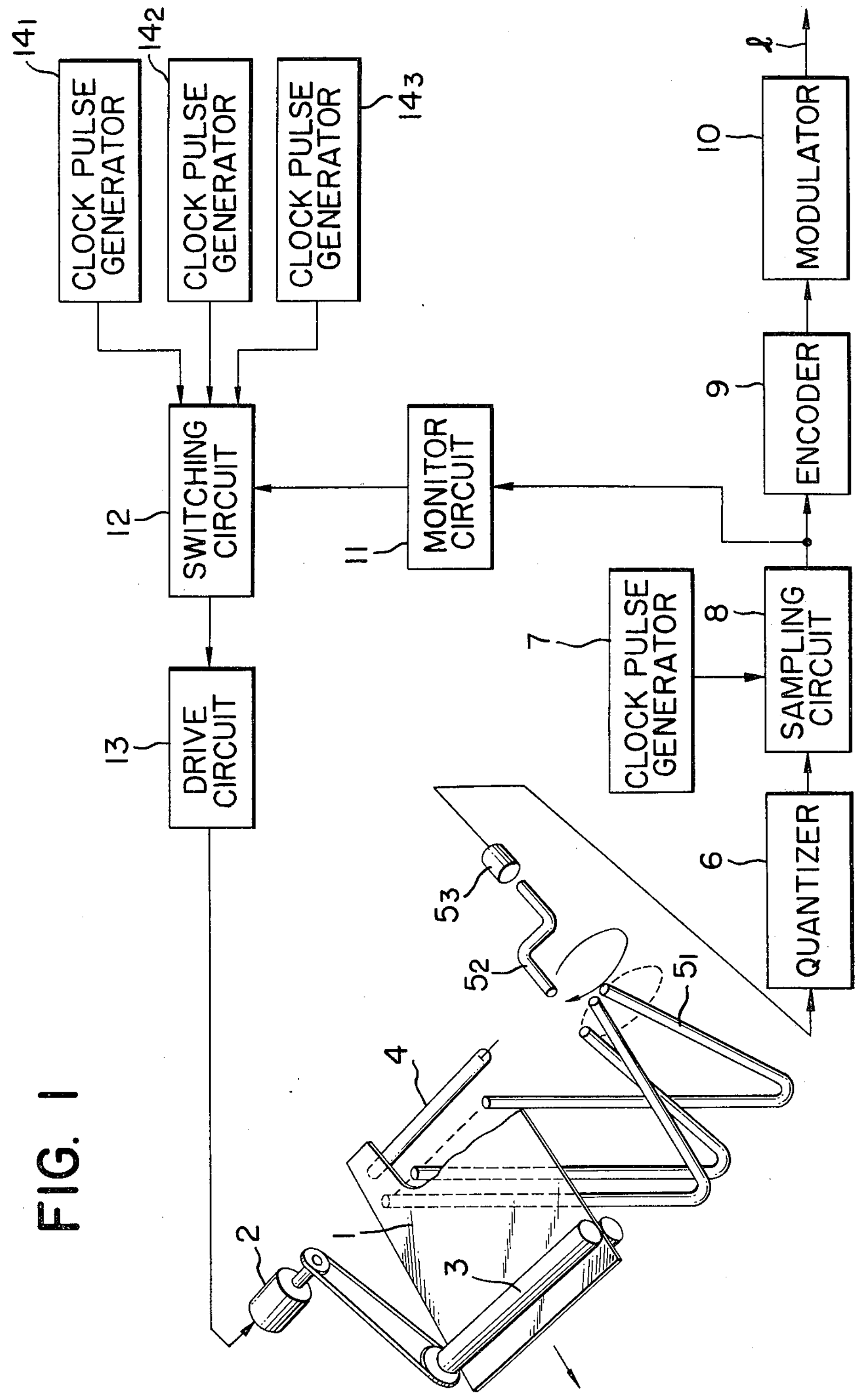
FIG. 1 is a block diagram of a facsimile transmission system in accordance with the present invention.

Referring to FIG. 1, a subject copy 1 to be transmitted is transported in the direction indicated by the arrow by a pair of feed rollers 3 driven by a motor 2 which may be a pulse motor. A light source 4 illuminates the subject copy 1, and the reflected light is transmitted through a bundle of optical fiber tubes $\mathbf{5_1}$. At one end the tubes are arrayed in a row and at the other end the tubes are arrayed in the form of a circle and in opposed relation with an optical fiber tube crank mechanism $\mathbf{5_2}$ which is adapted to scan the output ends of the optical fiber tubes $\mathbf{5_1}$. Therefore, the optical output signals are sequentially scanned and applied to a photoelectric cell $\mathbf{5_3}$. The optical fiber tube scanning system of the type described is well known in the art so that no further description thereof will be made in this specification.

The video signals from the photoelectric cell $\mathbf{5_3}$ are applied to a conventional transmission system comprising a quantizer 6, a clock pulse generator 7, a sampling circuit 8, an encoder 9, and a modulator 10 so that they are quantized, sampled, encoded, compressed, modulated and transmitted on a transmission line *l*. Some transmission systems may have no encoder 9. The transmission system of the type described is well known in the art and no further description thereof will be made in this specification.

A train of binary coded video signals is also transmitted from the sampling circuit 8 to a monitor circuit 11 in which the densities of "1" and "0" signals in the video signal train are monitored. In response to the output signals of the monitor circuit 11 representing the densities of "1" and "0" signals a switching circuit 12 is so actuated as to connect one of clock pulse generators $\mathbf{14_1}$, $\mathbf{14_2}$, . . . , and $\mathbf{14_n}$, which generate clock pulses of different pulse repetition rates, to a motor drive circuit 13 to drive the pulse motor 2 with a desired pulse repetition rate. Therefore, the pulse motor 2 is driven at a low speed when the black-and-white-dot, or −1 elementary-area pattern of the subject copy is dense but when the pattern is coarse or thin, the pulse motor 2 is driven at a high speed. Thus, it is readily understood that the low-speed driving of the pulse motor 2 results in the increase in the density of scanning lines and that the high-speed driving results in the decrease in the density of scanning lines.

Next referring to FIG. 2, one embodiment of the monitor circuit capable of varying the scanning line density in three steps will be described in more detail.

The binary video signals S from the sampling circuit 8 are applied to an one-bit shift register 15 and an exclusive OR gate 16 so that only when the adjacent bit patterns in the binary video signals S are different from each other the exclusive OR gate 16 provides the signal "1." Therefore when the black-and-white dot pattern of the subject copy becomes dense the number of output signals "1" of the exclusive OR gate 16 is increased, but when the pattern becomes coarse or thin, the number is reduced. The output signals "1" are transferred into counters 17 and 18. The first counter 17 is adapted to count the number of boundaries (or transitions) between adjacent bits which are not coincident with each other in each scanning line when the scanning line density is A line/mm, and in like manner the counter 18 is adapted to count the number of such boundaries (or transitions) when the scanning line density is B line/mm. Furthermore, each of the counters 17 and 18 is adapted to provide the output signal "1" when the number of boundaries counted is in excess of a predetermined number. In this specification the term "noncoincident bits" is used to refer to the adjacent bits in the video signal train which are different in bit pattern from each other.

Sync signal T is provided whenever scanning of one line is completed. In the instant embodiment, sync signal T is provided whenever the optical fiber crank $5_2$ (see FIG. 1) makes one rotation.

The output pulses generated by a pulse generator 29 are applied to a frequency divider 30 which is coupled to another frequency divider 31 so that the repetition rate $f_1$ of the output pulses is stepped down to $f_2$ by the first frequency divider 30 which in turn is stepped down to $f_3$ by the second frequency divider and the following relation is held:

$$f_1 > f_2 > f_3.$$

When the number of noncoincident bits is in excess of a predetermined number so that the output signal "1" is generated by the first counter 17, a flip-flop 22 is switched to the state "1" in synchronism with the sync signal T, and the clock signal of the pulse repetition rate $f_3$ is transferred through an AND gate 25 and an OR gate 28 to the motor drive circuit 13. When the output signal of the counter 17 is "0" while the output signal of the second counter 18 is "1," both input signals to an AND gate 20 are "1s" because the output signal "0" of the first counter 17 is inverted by an inverter 19 so that the AND gate 20 provides an output signal which in turn sets a flip-flop 23 into the state "1" in synchronism with the sync signal T. As a result the clock signal of the repetition rate $f_2$ is transmitted from the frequency divider 30 through an AND gate 26 and the OR gate 28 to the drive circuit 13. When the output signals of the first and second counters 17 and 18 are "0s," a NOR gate 21 provides an output signal in response to which a flip-flop 24 is switched to the state "1" so that the clock signal of frequency $f_1$ is transmitted from the clock pulse generator 29 through an AND gate 27 and the OR gate 28 to the drive circuit 13. The first and second counters 17 and 18 are reset in response to the sync signal T for receiving the binary video signals of the next scanning line.

When the predetermined numbers of the first and second counters 17 and 18 are $N_1$ and $N_2$ ($N_1 > N_2$), the pulse motor 2 which controls the transportation in speed of the subject copy 1 is driven at the lowest frequency $f_2$ when the number of noncoincident bits counted by the first counter 17 is in excess of the number $N_1$, whereby the motor 2 drives the subject copy 1 at a lowest speed and successive scanlines are close to each other. When the numbers of noncoincident bits counted by the first and second counters 17 and 18 are in excess of the predetermined number $N_2$ but not in excess of the number $N_1$ the pulse motor 2 is driven at the frequency $f_2$. When the counted numbers are below the predetermined numbers $N_1$ and $N_2$, the pulse motor 2 is driven at the frequency $f_1$ which is the highest frequency, whereby the subject copy 1 is driven at a fast speed and successive scanlines are far apart. When the frequency at which the pulse motor is driven is varied, a pitch to the next scanning line is varied accordingly. Therefore it is seen that the high or low scanning line density may be automatically selected depending upon the density of information recorded upon the subject copy.

Figure 2:
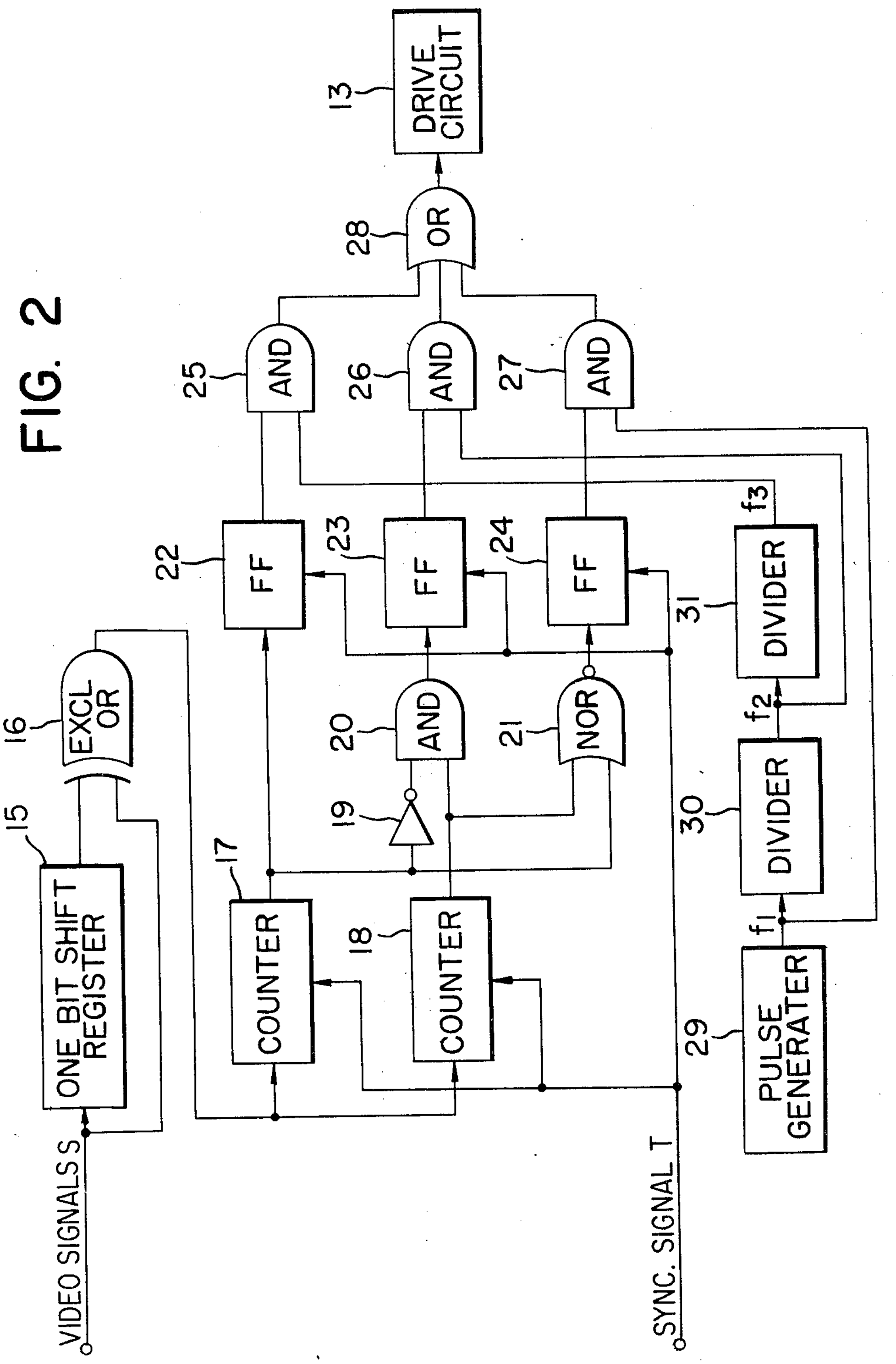
FIG. 2 is a block diagram of a monitor circuit thereof.

In the case of the arrangement shown in FIG. 2, the black and white dot density of information recorded upon the subject copy is detected by counting the adjacent non-coincident bits in each scanning line so that if only one part of one scanning line has a dense black and white dot pattern, there is a fear that information contained in this scanning line is detected as being coarse or thin. This problem may be overcome by an arrangement to be described hereinafter with reference to FIG. 3.

Figure 3:
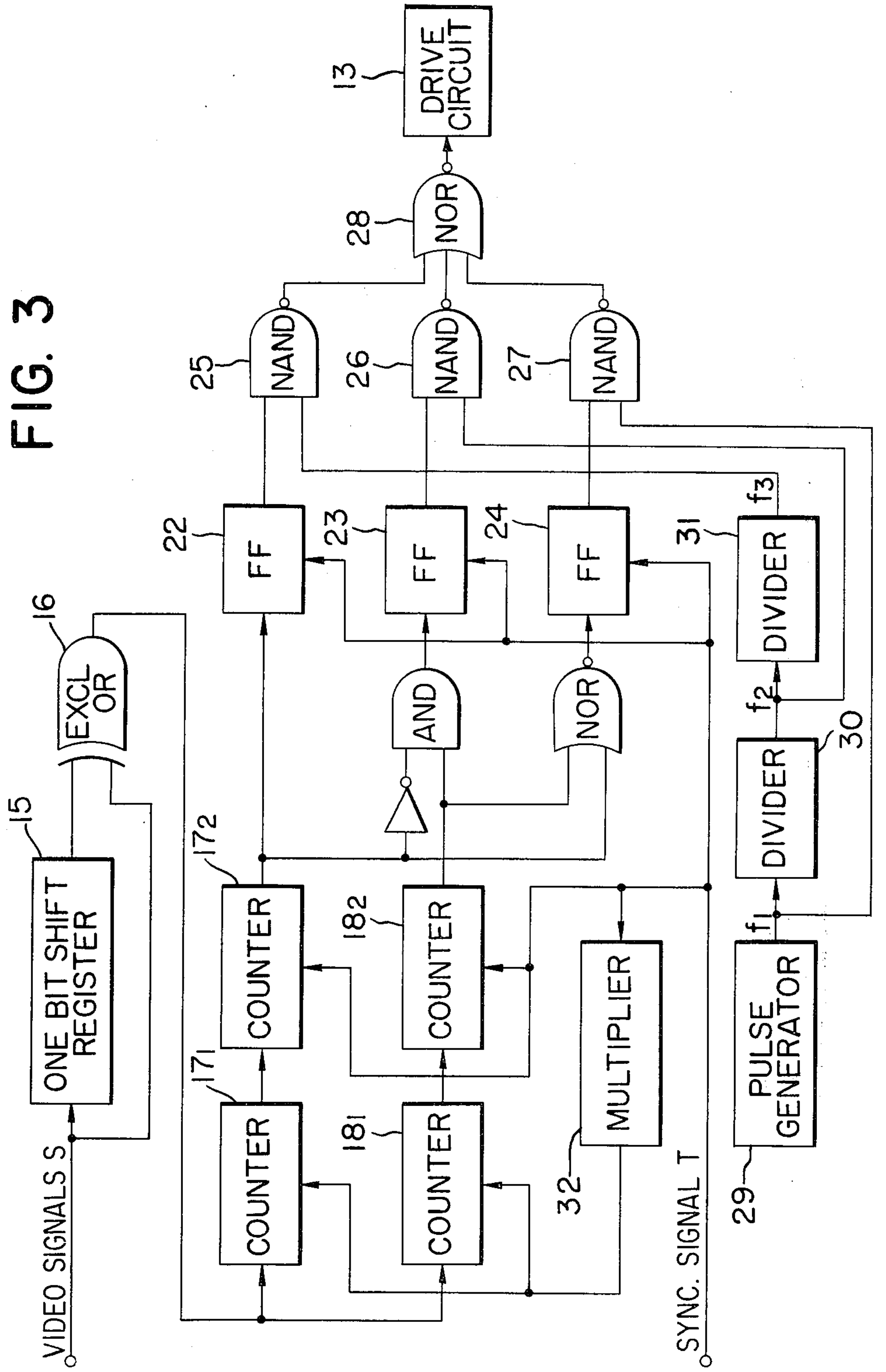
FIGS. 3 and 4 are block diagrams of variations thereof, respectively.

The monitor circuit shown in FIG. 3 has two sets of counters $17_1$ and $17_2$ and $18_1$ and $18_2$ in order to detect the density of information. The counters $17_1$ and $18_1$ are adapted to be reset in response to a sync signal whose pulse spacing is an N integral sub-multiple of that of the sync pulse T while the counters $17_2$ and $18_2$ are adapted to be reset in response to the sync signal T. Except these counters $17_1$, $17_2$, $18_1$ and $18_2$, the monitor circuit shown in FIG. 3 is substantially similar in construction to that shown in FIG. 2. A unit 32 is the multiplier.

The counter $17_1$ is adapted to detect the case of high information density. That is, it is adapted to provide the output signal "1" when the number of noncoincident bits counted during each N integral sub-multiple of the pulse spacing of the sync signal is in excess of a predetermined number $N_1$. In other words, the counter $17_1$ is adapted to count the noncoincident bits N times during a time interval required for scanning one scanning line. The counter $17_2$ is adapted to provide the output signal "1" when the number of the output signals "1" received from the counter $17_1$ is in excess of a predetermined number $N_{12}$. The counting time interval of the counter $17_2$ is equal to the pulse spacing of the sync signal T so that the counter $17_2$ counts the output signals of the counter $17_1$ during each scanning cycle.

The counter $18_1$ is adapted to detect the case of a lower information density. That is, it is adapted to count the noncoincident bits in the video signal train S during a time interval equal to 1/N of the time for each horizontal scanning line, and to provide the output signal "1" when the counted number is in excess of a predetermined number $N_2$. On the other hand the counter $18_2$ is adapted to count the output signals "1" of the counter $18_1$ during the time for each horizontal scanning line.

As described hereinbefore the counters $17_1$ and $18_1$ are adapted to count the noncoincidence bits during a time interval equal to 1/N of the time for each scanning line so that when N is suitably selected, a high information density portion which is only a part of each scanning line may be precisely detected. The counters $17_2$ and $18_2$ are adapted to count the output signals of the counters $17_1$ and $18_1$, respectively, for a time interval equal to the time for each scanning line so that the accuracy with which the monitor circuit detects the information density of the subject copy may be adjusted if the predetermined numbers $N_{12}$ and $N_{22}$ are selected between 1 and N.

Figure 4:
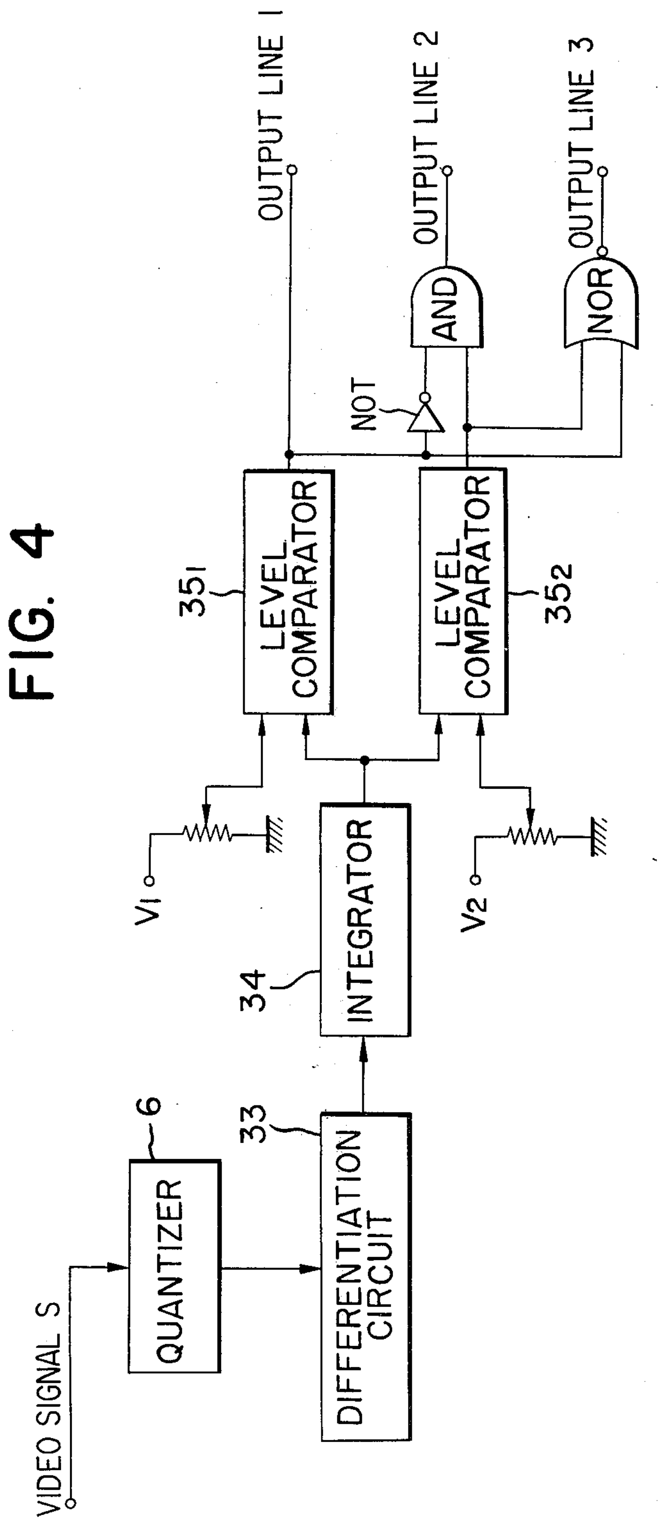

In general when the subject copy is scanned at a predetermined scanning speed, the higher (or more complex) the information density (or pattern), the higher the frequency of the electrical video signal becomes. Upon this observed fact is based the arrangement shown in FIG. 4. That is, the video signal S' which is provided by scanning the subject copy is quantized by the quantizer 6 and then converted into the voltage signal by a differentiation circuit 33 and an integrator 34. The voltage signal is applied to level comparators $35_1$ and $35_2$ to which are applied the reference voltages $V_1$ and $V_2$ representing predetermined noncoincidence bits when the scanning line densities are A line/mm and B line/mm, respectively, where A > B. The comparators $35_1$ and $35_2$ therefore provide the output signals "1" when the output voltage signal of the integrator 34 is in excess of the reference voltages $V_1$ and $V_2$, respectively. Three output lines 1, 2 and 3 are connected to the AND gates 25, 26 and 27, respectively, shown in FIG. 2. Therefore the pulse motor 2 is driven at a frequency depending upon the information density of the subject copy in a manner substantially similar to that described hereinbefore. In the instant embodiment, two comparators $35_1$ and $35_2$ are used, but it is to be understood that a plurality of comparators may be used.

In the above embodiments, the scanning line density in the auxiliary scanning direction is varied depending upon the information density of a subject copy, but it is to be understood that the scanning line density in the main scanning direction may be also varied, for example, by changing the frequency of the clock signal generated by the clock signal generator 7 in response to the output of the monitor circuit 11 so as to vary the sampling frequency of the sampling circuit 8. It is preferable that the scanning line densities in the main and auxiliary scanning directions are same so that they may be simultaneously varied so as to produce a copy of better quality. Furthermore, the present invention may be also applied to analog facsimile system in which the monitor circuit of the type described with reference to FIG. 4 may be used.

What is claimed is:

1. A facsimile transmission system comprising
  a. means adapted to scan a subject copy so as to read out the image information thereupon consisting of black and white patterns,
  b. transmission means adapted to transmit said image information through a communication line,
  c. monitor means adapted to monitor the density of said image information, and
  d. means adapted to vary the scanning line density of successive noncongruent scanning lines in the scanning by said scanning means in response to the output of said monitor means.

2. A facsimile transmission system as defined in claim 1 wherein said monitor means comprises
  a. level detecting means adapted to provide an output signal whose level represents the frequency of the image information, and
  b. control means adapted to provide the control signal for controlling the scanning line density in response to said output signal of said level detecting means.

3. A facsimile transmission system as defined in claim 1 further comprising
  a. means adapted to quantize and sample said image information of said scanning means and provide a corresponding binary output signal train, and
  b. means adapted to transfer the binary output signal train provided by said quantizing and sampling means.

4. A facsimile system as defined in claim 3 wherein said monitor means comprises
  a. detecting means adapted to provide an output signal whenever the successive adjacent bit patterns in said binary output signal train are detected as being noncoincident with each other,
  b. counter means adapted to count the output signals of said detecting means, and to provide a corresponding counter output, and
  c. means to provide a control signal for controlling the scanning line density in response to the output of said counter means.

5. A facsimile transmission system as defined in claim 4 wherein
  said counter means comprises a plurality of counters each adapted to provide an output signal when the content of each counter reaches a predetermined number, and the contents of said plurality of counters are set and reset at a time interval equal to the time for each scanning line.

6. A facsimile transmission system as defined in claim 4 wherein said counter means comprises
  a. a first counter and a second counter each adapted to detect said noncoincident adjacent bit patterns,
  b. a third counter adapted to count overflow pulses from said first counter,
  c. a fourth counter adapted to count overflow pulses from said second counter,
  d. the maximum bits countable by said first and second counters being different,
  e. said first and second counters adapted to be repeatedly set and reset at a time interval shorter than the time for each scanning line,
  f. said third and fourth counters adapted to be repeatedly set and reset at a time interval equal to the time for each scanning line, and
  g. the maximum bits countable by said third and fourth counters being different.

7. A facsimile system comprising:
  means for scanning a subject copy along successive scanlines to provide successive binary bits each representing the darkness of an elemental area of a scanline;
  means for comparing successive binary bits provided by the scanning means with each other to provide a noncoincidence signal each time the compared bits are not equal; and
  means for determining the distance along the subject copy between successive noncongruent scanlines in accordance with the number of said noncoincidence signals provided during a selected time interval.

8. A facsimile system as in claim 7 wherein the determining means comprise a first and a second counter each counting said noncoincidence signals and each providing an output signal after counting a respective first and second number of noncoincidence signals, said first and second number being different from each other, a third and a fourth counter counting the output signals provided by said first and second counter respectively, each of said third and fourth counter providing a control signal after counting a respective third and fourth selected number of said output signals, said third and fourth selected numbers being different from each other, means for selecting said distance between the scanlines in accordance with the presence and absence of said third and fourth control signal, and means for clearing each of said third and fourth counter after a time interval substantially equal to the time of scanning a scanline and for clearing said first and second counter after a time interval which is a submultiple of the scanline time interval.

9. A facsimile system as in claim 7 wherein the determining means comprise:

a first and a second counter each counting said noncoincidence signals during said selected time interval and each providing an output signal after accumulating a respective first and second selected count which are different from each other; and means for selecting said distance between scanlines in accordance with the presence and absence of said counter output signals.

10. A facsimile system as in claim 9 wherein said selected time interval is substantially equal to the time of scanning one scanline.

11. A facsimile system comprising means for scanning a subject copy along successive scanlines to provide a video signal whose amplitude variations represent the darkness variations along said scanlines;

means for processing said video signal to provide a first control signal having a parameter representing the frequency content of the video signal;

means for providing a reference and for comparing the parameter of the first control signal with said reference to provide a second control signal having a parameter depending on said comparison; and means for determining the distance along the subject copy between the current and the next scanline depending on said parameter of the second control signal, said distance being a finite, nonzero distance.

12. A method of operating a facsimile system having a device for scanning a subject copy comprising the steps of scanning a subject copy along successive scanlines to provide successive binary bits each representing the darkness of an elemental area of a scanline;

comparing successive binary bits with each other to provide a noncoincidence signal each time the compared bits are not equal; and determining the distance along the subject copy between successive noncongruent scanlines in accordance with the number of noncoincidence signals provided during each selected time interval.

* * * * *